Figure 1:
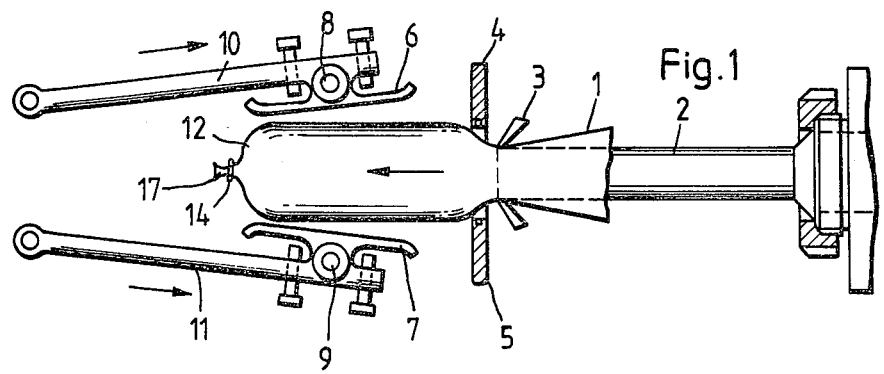

United States Patent [19]

Niedecker

[11] 4,434,528
[45] Mar. 6, 1984

[54] PROCESS AND APPARATUS FOR MAKING PARTIALLY FILLED AIR-FREE SAUSAGE CASINGS

[76] Inventor: Herbert Niedecker, Am Ellerhang 6, D 6240 Königstein 2, Fed. Rep. of Germany

[21] Appl. No.: 381,264

[22] Filed: May 24, 1982

[30] Foreign Application Priority Data

May 27, 1981 [DE] Fed. Rep. of Germany ....... 3121101

[51] Int. Cl.³ ............................................. A22C 11/02
[52] U.S. Cl. ........................................... 17/49; 17/34
[58] Field of Search .......................... 17/34, 41, 42, 49

[56] References Cited

U.S. PATENT DOCUMENTS 723,072   3/1903  Thom ................................. 17/42 X
4,160,305 7/1979  Tysver .................................. 17/49

Primary Examiner—Willie G. Abercrombie
Attorney, Agent, or Firm—Sprung, Horn, Kramer, Woods

[57] ABSTRACT

When sausage casings closed at one end are filled and closed on a combined filling and closing machine in the making of sausages which in their final shape have a non-circular cross-section, the sausage casings are filled to less than their entire volumetric capacity because, e.g., a rectangular cross-section has a larger perimeter than a circular cross-section having the same area. In order to exclude air from the unfilled portion of such sausage casings as far as possible and to permit the processing of small and large sausage casings and the filling of sausage meat into a sausage casing consisting of a continuous tubing, part of the sausage casing is initially filled with the intended quantity of sausage meat. The displacing shears of the closing machine are then almost completely closed. Thereafter the filled sausage is compressed by means of pressing jaws before the sausage casing is closed. The additional sausage casing material which is required to accommodate the displaced sausage meat is pulled along between the displacing shears at the same time.

6 Claims, 9 Drawing Figures

U.S. Patent   Mar. 6, 1984   Sheet 1 of 2   4,434,528

PROCESS AND APPARATUS FOR MAKING PARTIALLY FILLED AIR-FREE SAUSAGE CASINGS

This invention relates to a process of filling and closing a sausage casing which is closed at one end on a combined filling and closing machine, wherein the sausage casing is filled to less than its entire volumetric capacity before it is closed at its other end.

In the manufacture of sausages it is often desirable to provide a sausage which in its condition ready for consumption has a cross-section which differs from the conventional, round configuration. A rectangular or square cross-section is often required, e.g., for sausages to be laid in slices on toasted bread. For making such so-called square sausage, the filled sausage casing after its closure is pressed to its final cross-section in a suitable mould and is stabilized in the resulting cross-sectional shape, e.g., by being boiled. As a rectangular cross-section has a larger perimeter than a circular cross-section having the same area, such sausage casing must be filled to less than its entire volumetric capacity before it is pressed to its final cross-section. On the other hand, the sausage casing which is slack because it has been filled to less than its entire volumetric capacity must be substantially free from air because included air will have a detrimental influence on the quality of the filling and would detract from the appearance of the sausage.

It is known that filled and closed sausage casings which are slack and substantially free from air can be made in that the volumetric capacity of the sausage casing during the filling operation is decreased by an element which decreases the free cross-sectional area of the sausage casing and is mounted on that portion of the sausage casing which adjoins the previously closed end of the sausage casing (Laid-open German Application DOS No. 22 54 943), but that practice involves the disadvantage that it takes a rather long time because the operator of the combined filling and closing machine must fit the sleeve onto the sausage casing section and must remove the sleeve before the sausage casing is placed into the mould.

It is also known from Laid-Open German Applications Nos. 22 10 054 and 20 54 441 that rectangular sausages which are relatively small in cross-section can be made in that the filled sausage casing is shaped by a conveyor belt having rectangular boundaries and filled rectangular sausage sections are then obtained by means of a dividing roll or by cams. But that practice has the disadvantage that it can be used only for making relatively thin sausages and cannot be used at all for making sausages which are relatively large in diameter, e.g., because they are to be laid in slices on toast. Besides, that practice cannot be used where individual sausage casing sections are to be filled, as is often desired in the making of sausages which are relatively large in cross-section. For this reason it is an object of the invention to provide a process which is of the kind described first hereinbefore and can be used to make small and large sausages by filling individual sausage casing sections or a sausage casing consisting of a continuous tubing.

This object is accomplished according to the invention in that part of the sausage casing is first tightly filled with the intended quantity of sausage meat, the displacing shears of the closing machine are then almost completely closed and before the filled sausage casing is closed the sausage is compressed by pressing jaws and the additional sausage casing material which is required to accommodate the displaced sausage meat is pulled along between the displacing shears at the same time. The advantage afforded by the process according to the invention resides in that a substantially air-free additional volume for receiving sausage material is made available which is necessary for bringing the filled sausage to the desired rectangular cross-section because the closed displacing shears pull sausage casing material along.

This is particularly ensured if the internal pressure within the filled sausage is maintained when the sausage casing material is pulled along. For this purpose the quantity of sausage casing material which is pulled along is restricted to the quantity required as the filled sausage is compressed by the pressing jaws. The process according to the invention can be used to make sausages which are small or large in cross-section from individual sausage casing sections or by filling a sausage casing consisting of a continuous tubing, also in closing machines in which two closing clips are placed on the sausage casing at spaced apart locations so that the trailing end of one sausage casing and the leading end of the next sausage casing are closed at the same time.

In the process according to the invention the displacing shears of the closing machine are closed in known manner but care must be taken to ensure that the displacing shears provide an adequate clearance for the constricted end portion of the sausage casing so that the additional sausage casing material which is required can be pulled along. In closing machines in which the constricted end portion is formed in that a closing clip is placed onto the end portion or by a preliminary displacing member, that clearance is ensured in that the closing punch first performs only a partial closing stroke or a preliminary constricting member is properly used. In closing machines in which the end portion is constricted only by the displacing shears, the above-mentioned clearance is obtained in that the closing movement of the closing shears is interrupted in a position in which the shears are almost completely closed so that additional sausage casing material can be pulled along and after the sausage has been compressed the displacing shears are completely closed to form the final constricted end portion, which is then closed with the closing clip.

The pressing jaws for compressing the filled sausage may be adjustable so that the filled sausage has the desired filling volume. The pressing jaws are adjusted or replaced for every desired size of sausage.

FIG. 1 is a top plan view showing apparatus for carrying out the process according to the invention when the filling operation has been completed.

Figure 2A:
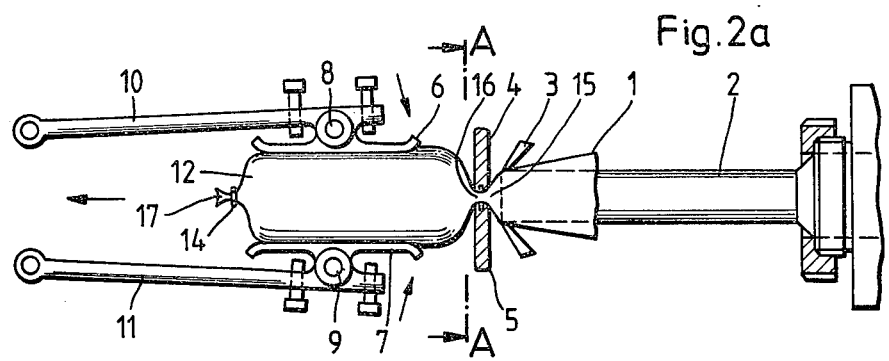
Figure 3A:
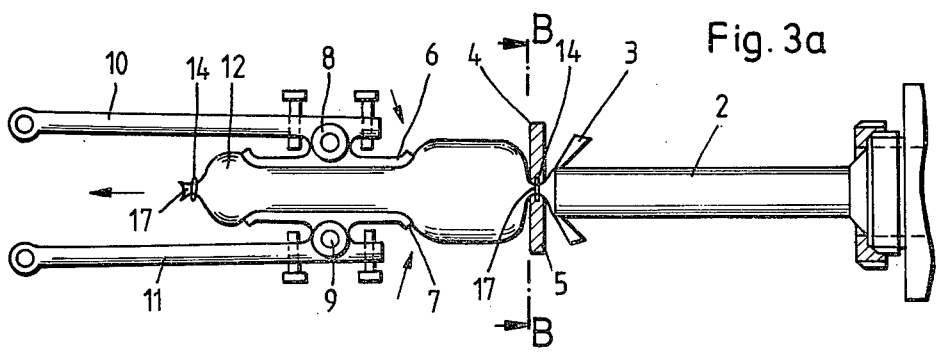
Figure 2B:
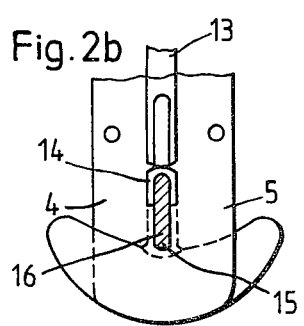
Figure 3B:
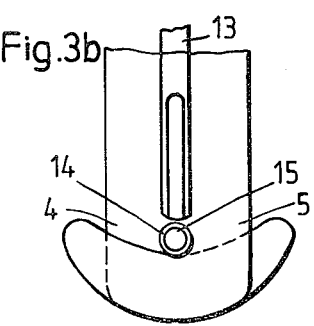
Figure 5B:
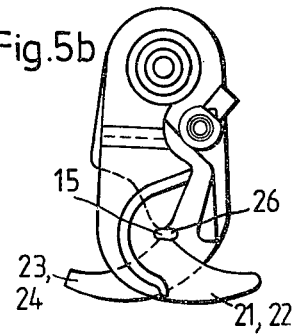
Figure 4:
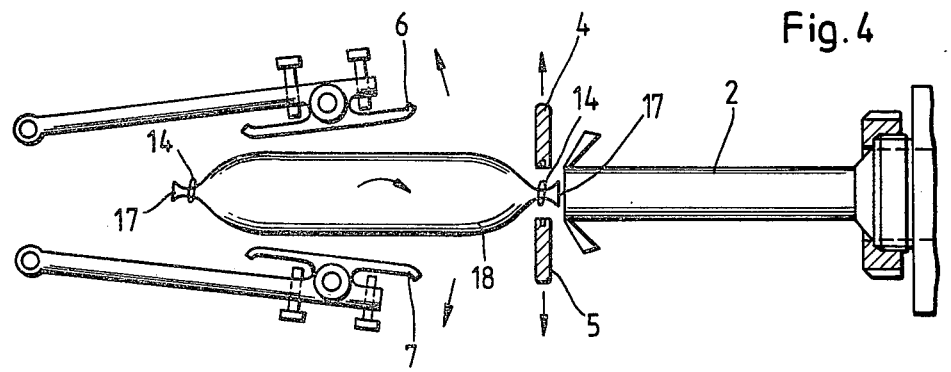
Figure 5A:
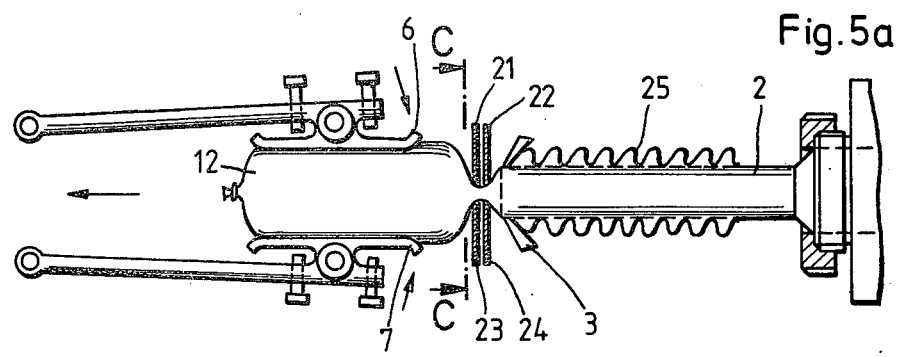
Figure 6:
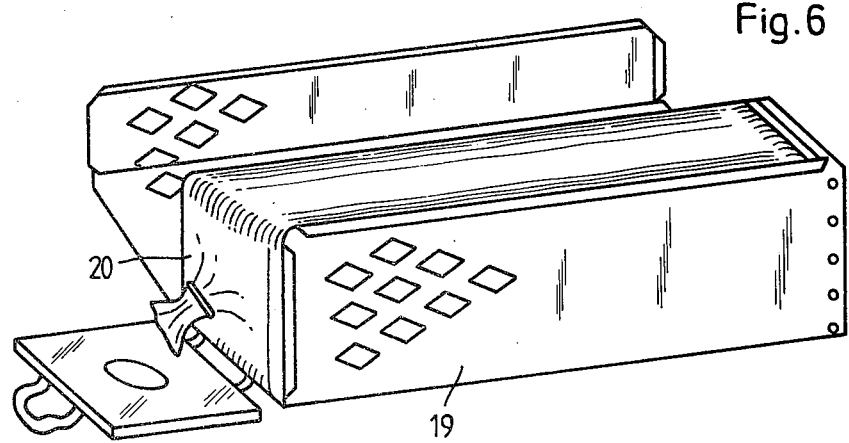

FIG. 2a shows the same apparatus when the displacing shears have been closed and the compressing operation has been initiated, FIG. 2b is a sectional view taken on line A—A in FIG. 2a, FIG. 3a shows the same apparatus when the compressing, pulling-off and closing operations have been completed, FIG. 3b is a sectional view taken on line B—B in FIG. 3a, FIG. 4 shows the same apparatus in position for discharging the sausage which has been partly filled and closed, FIG. 5a is a top plan view showing the apparatus of FIG. 2a with the pairs of displacing shears partly closed for processing a sausage casing which has been constricted on the filling tube, FIG. 5b is a sectional view taken on line C—C in FIG. 5a, and FIG. 6 shows a square mould with a sausage which has been pressed to have an approximately square cross-section.

FIGS. 1 to 5 show apparatus for carrying out the process according to the invention. In accordance with FIG. 1, a sausage casing 1 which has been closed at one end has been fitted onto the filling tube 2 of a known sausage filler. The filling tube 2 is mounted on a multiple tube turret, which is mounted on the filling machine. During the filling of sausage meat into the sausage casing 1, the latter is pulled off in the filling direction between the filling tube 2 and a casing snubber 3 as a result of the filling operation.

A known closing machine having displacing shears 4, 5 is combined with the filling machine, on which the filling tube 2 is mounted. FIG. 1 shows the position reached when the filling operation has been completed and an unfilled residual portion of the sausage casing 1 is still on the filling tube 2.

In the position shown in FIG. 2a, the displacing shears 4, 5 behind the filled sausage 12 are closed. The pressing jaws 6, 7 are connected by hinges 8, 9 to a linkage 10, 11 and engage the tightly-filled sausage 12 and compress the same and simultaneously withdraw the sausage 12 in the filling direction so that the residual portion of the sausage casing 1 from the filling tube 2 is pulled along between the closed displacing shears 4, 5. As a result, the sausage meat which is displaced by the compressing operation can be taken up by the sausage casing so that the decrease of the volumetric capacity of the sausage casing due to the compressing of the sausage is compensated and the sausage casing 1 can accommodate the same quantity of sausage meat as before the compressing of the sausage.

FIG. 2b is a sectional view taken on line A—A in FIG. 2a and shows the almost completely closed displacing shears 4, 5. The closing punch 13 carrying the closing clip 14 has performed a partial closing stroke so that the closing clip 14 has preconstricted the end portion 15 and the residual portion of the sausage casing can be pulled along through the clearance 16 between the shears 4, 5.

In the position shown in FIG. 3a, the compressing and pulling-off operation has been completed and the sausage 12 has been closed by the closing clip 14 also at its rear end 17. FIG. 3b is a sectional view taken on line B—B in FIG. 3a and shows the closing punch 13 shortly before the closing operation is completed.

In the position shown in FIG. 4, the displacing shears 4, 5 of the closing machine have been opened and the pressing jaws 6, 7 have been moved to their initial position. The sausage 18 which has been filled to a slack condition and has been closed is discharged by the closing machine and can now be placed into the metal mould 19 (FIG. 6) and compressed therein to form a square sausage 20.

FIG. 5a is a top view showing the same apparatus as FIG. 2a but with pairs of displacing shears 21, 22, and 23, 24, and a sausage casing consisting of a continuous tubing 25, from which individual sausages or series of interconnected sausages can be made and are then closed with pairs of closing clips, which are spaced a predetermined distance apart.

FIG. 5b is a sectional view taken on line C—C in FIG. 5a and shows the pairs of displacing shears 21, 22 and 23, 24 in an almost closed position so that they define a clearance 26, through which the preconstricted portion 15 of the sausage casing can just be pulled along. When the sausage has been compressed and the continuous tubing 25 has been pulled along in the required length, the pairs of displacing shears 21, 22 and 23, 24 are completely closed and the closing clip is closed around the constricted portion of the tubing in an operation which is similar to that illustrated in FIGS. 3a and b.

If desired the lateral compression of the filled sausage casing can be discontinued prior to completing closure since the additional casing material then cannot go back into the filling tube. It is even possible to defer initiating closure until after advance of the additional casing material, although the illustrated embodiments are preferred.

It will be understood that the specification and examples are illustrative but not limitative of the present invention and that other embodiments within the spirit and scope of the invention will suggest themselves to those skilled in the art.

What is claimed is:

1. In the filling of a sausage casing initially closed at one end and closing the second end of the casing on a machine having filling means and means for closing the casing, wherein the casing is filled to less than its entire volumetric capacity and thereafter is closed at its second end, the improvement which comprises first tightly filling the casing beginning with the first end, when the desired amount of filling has been supplied compressing the casing laterally between its two ends while permitting the casing to advance forwardly to provide additional casing material to accommodate the filling displaced by the compression, the additional casing material sliding past the locus of partial closure, and thereafter closing the second end.

2. The process according to claim 1, wherein the lateral pressure is maintained on the filled casing at least until the casing reaches its forward position.

3. The process according to claim 1, wherein after filling the casing but before laterally compressing the casing the second end of the casing is partially closed, closure being completed only after the desired amount of additional casing material has been advanced past the closing means.

4. In an apparatus for filling a sausage casing initially closed at one end and closing the second end of the casing, comprising filling means and means for closing the casing, the improvement which comprises means for compressing the casing laterally between its first and second ends, the means for closing the casing including means for effecting closure first partially and thereafter completely, whereby after the casing has been supplied with the desired amount of filling the partial closing means is actuated, then the laterally compressing means is actuated so that the casing can advance forwardly to provide additional casing material to accommodate the filling displaced by the compression, the additional casing material sliding past the partial closing means, the complete closing means thereafter completing closure.

5. An apparatus according to claim 4, wherein the partial closing means comprises a preliminary constricting member.

6. An apparatus according to claim 4, wherein the closing means comprises a punch operating on a clip which is to be closed, partial closing being effected by displacing the clip to a location short of its final position, and complete closing being effected by further displacing the clip so as to assume its final closing position.

* * * * *